(12) United States Patent
Yin et al.

(10) Patent No.: US 10,393,999 B2
(45) Date of Patent: Aug. 27, 2019

(54) SIX-ASPHERIC-SURFACE LENS

(71) Applicant: OmniVision Technologies, Inc., Santa Clara, CA (US)

(72) Inventors: Chuen-Yi Yin, New Taipei (TW); Jau-Jan Deng, Taipei (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 99 days.

(21) Appl. No.: 15/286,932

(22) Filed: Oct. 6, 2016

(65) Prior Publication Data

US 2018/0100992 A1 Apr. 12, 2018

(51) Int. Cl.
*G02B 3/02* (2006.01)
*G02B 13/18* (2006.01)
*G02B 13/00* (2006.01)
*G02B 9/64* (2006.01)
*G06K 9/00* (2006.01)
*H04M 1/02* (2006.01)

(52) U.S. Cl.
CPC .......... *G02B 13/0045* (2013.01); *G02B 9/64* (2013.01); *G06K 9/00604* (2013.01); *H04M 1/026* (2013.01)

(58) Field of Classification Search
CPC ... G02B 9/06; G02B 9/36; G02B 9/60; G02B 9/62; G02B 9/64; G02B 13/0035; G02B 13/0045; G02B 13/0055; G02B 13/0085; G02B 13/0003; G02B 13/004; G02B 13/006; G02B 13/18; G02B 23/243; G02B 23/2438; G02B 27/0025; G02B 27/0037; G02B 27/0075; G02B 27/4211;

(Continued)

(56) References Cited

U.S. PATENT DOCUMENTS 7,841,785 B2 11/2010 Hirao et al.
7,995,293 B2 8/2011 Kawasaki et al.
(Continued)

FOREIGN PATENT DOCUMENTS

WO 2008020899 A2 2/2008

OTHER PUBLICATIONS

Taiwanese Patent Application No. 106133786, English translation of Office Action dated Dec. 29, 2017, 5 pages.
(Continued)

*Primary Examiner* — Mustak Choudhury
(74) *Attorney, Agent, or Firm* — Lathrop Gage LLP

(57) ABSTRACT

A six-aspheric-surface lens has six coaxially aligned lenses including, in order, a positive first lens, a negative second lens, a negative third lens, a negative fourth lens, a negative fifth lens, and a plano-gull-wing sixth lens. The six-aspheric-surface lens also includes a first biplanar substrate between the first lens and the second lens, a second biplanar substrate between the third lens and the fourth lens, and a third biplanar substrate between the fifth lens and the sixth lens. The first lens may have an Abbe number exceeding 48, the second lens and the third lens each may have an Abbe number less than 35. The first lens may have a focal length $f_1$ and the second lens may have a focal length $f_2$ such that $-0.27 < f_1/f_2 < -0.17$. The six-aspheric-surface lens may have an effective focal length $f_{eff}$ and a total track length T such that $0.9 < T/f_{eff} < 1.1$.

6 Claims, 14 Drawing Sheets

(58) Field of Classification Search
CPC .......................... G02B 27/4216; G02B 13/001; G02B 13/003; G02B 13/04; G02B 9/10; G02B 13/00; G02B 13/0025; A61B 1/00163; A61B 1/05; H04N 5/2254; H04N 5/2257
USPC ............... 359/658, 752, 756, 439, 649, 708, 359/713–717, 740, 773, 784–793
See application file for complete search history.

(56) References Cited

U.S. PATENT DOCUMENTS

| | | | |
|---|---|---|---|
| 8,000,037 B2 * | 8/2011 | Hirao | ................. G02B 13/0035 359/716 |
| 8,279,535 B2 | 10/2012 | Hsu et al. | |
| 8,477,437 B2 | 7/2013 | Hirao et al. | |
| 2010/0220955 A1 * | 9/2010 | Mitamura | ............ G02B 6/4204 385/33 |
| 2014/0192424 A1 | 7/2014 | Matsui et al. | |
| 2018/0196227 A1 | 7/2018 | Cheng et al. | |

OTHER PUBLICATIONS

Taiwan Patent Application No. 106146592, English translation of Office Action dated Jun. 8, 2018, 2 pages.

U.S. Appl. No. 15/402,523, Non-Final Office Action dated Oct. 11, 2018, 12 pages.

* cited by examiner

| surface | radius $r_c$ (mm) | thickness (mm) | minimum diameter (mm) | $n_d$ ($\lambda$=587.3 nm) | Abbe number | conic $k$ | aspheric coefficient |  |  |  |
|---|---|---|---|---|---|---|---|---|---|---|
|  |  |  |  |  |  |  | 4th-order term $a_4$ | 6th-order term $a_6$ | 8th-order term $a_8$ | 10th-order term $a_{10}$ |
| 211(1) | 1.1696 | 0.3450 | 1.830 | 1.511 | 57 | -0.0668 | -0.0160 | 0.0075 | -0.0146 | -0.0017 |
| 212(1) | ∞ | 0 | 1.620 |  |  |  |  |  |  |  |
| STOP 214(1) |  | 0 | 1.574 |  |  |  |  |  |  |  |
| 215(1) | ∞ | 0.3000 | 1.574 | 1.517 | 63 |  |  |  |  |  |
| 221(1) | ∞ | 0.0250 | 1.520 | 1.590 | 31 |  |  |  |  |  |
| 222(1) | 7.3256 | 1.0267 | 1.510 |  |  | 73.4768 | 0.0001 | -0.0611 | 0.1190 | -0.1680 |
| 231(1) | -5.2529 | 0.0200 | 1.390 | 1.590 | 31 | -10.6308 | -0.1631 | -0.0040 | -0.1674 | -0.9731 |
| 232(1) | ∞ | 0 | 1.450 |  |  |  |  |  |  |  |
| 235(1) | ∞ | 0.3000 | 1.450 | 1.517 | 63 |  |  |  |  |  |
| 241(1) | ∞ | 0.0200 | 1.600 | 1.520 | 50 |  |  |  |  |  |
| 242(1) | 13.9456 | 0.5041 | 1.650 |  |  | 139.6102 | 0.0080 | 0.6960 | -1.0382 | 0.4033 |
| 251(1) | -5.0833 | 0.0200 | 2.040 | 1.511 | 57 | 22.2953 | -0.4508 | 1.1880 | -0.9600 | 0.2876 |
| 252(1) | ∞ | 0 | 2.130 |  |  |  |  |  |  |  |
| 255(1) | ∞ | 0.3000 | 2.130 | 1.517 | 63 |  |  |  |  |  |
| 261(1) | ∞ | 0.1347 | 2.400 | 1.520 | 50 |  |  |  |  |  |
| 262(1) | 2.2971 | 0.1645 | 2.420 |  |  | -59.0348 | -0.2674 | 0.2247 | -0.0422 | -0.0258 |
| 365F | ∞ | 0.4000 | 2.640 | 1.5170 | 63 |  |  |  |  |  |
| 365B | ∞ | 0.0400 | 2.640 |  |  |  |  |  |  |  |
| 278(1) | ∞ | 0 | 2.640 |  |  |  |  |  |  |  |

FIG. 4

SIX-ASPHERIC-SURFACE LENS

BACKGROUND

A camera module has become a standard feature in mobile phones, tablets, and notebooks. Iris recognition is a new feature of such camera modules and may be used in mobile devices as well as other systems to limit access to information, tools, and locations to authorized people. Information, tools, and locations include computers, software, digital accounts, rooms, buildings, and military bases. For effective iris recognition, the imaging lens of the camera module must have a relatively narrow field-of-view (FOV) and high spatial resolution sufficient to resolve thin lines of a human iris. Conventionally, such a smaller FOV lens system has more than six optical surfaces, which increases production costs, and has a relatively long total track length, which prohibit its integration into a thin device such as smartphone.

SUMMARY OF THE INVENTION

Typically, smaller-FOV lens systems are expensive, by virtue of including more than six optical surfaces, and bulky by virtue of a relatively long total track length.

In one embodiment, a six-aspheric-surface lens has six coaxially aligned lenses. The six coaxially aligned lenses are, in order along direction of light propagation, a positive first lens, a negative second lens, a negative third lens, a negative fourth lens, a negative fifth lens, and a plano-gull-wing sixth lens. The six-aspheric-surface lens also includes a first biplanar substrate between the first lens and the second lens, a second biplanar substrate between the third lens and the fourth lens, and a third biplanar substrate between the fifth lens and the sixth lens.

In an embodiment, the first lens has an Abbe number exceeding 48 and the second lens and the third lens each have an Abbe number less than 35. In an embodiment, the first lens has a focal length $f_1$, and the second lens has a focal length $f_2$ such that $-0.27 < f_1/f_2 < -0.17$. In an embodiment, the six-aspheric-surface lens has an effective focal length $f_{eff}$ such that (i) the six-aspheric-surface lens forms an image at an image plane located a distance T from a front surface of the first lens opposite the second lens, and (ii) $0.9 < T/f_{eff} < 1.1$.

BRIEF DESCRIPTION OF THE FIGURES

FIG. 4 shows a table of exemplary parameters of the six-aspheric-surface lens of FIG. 3.

DETAILED DESCRIPTION OF THE EMBODIMENTS

Figure 1:
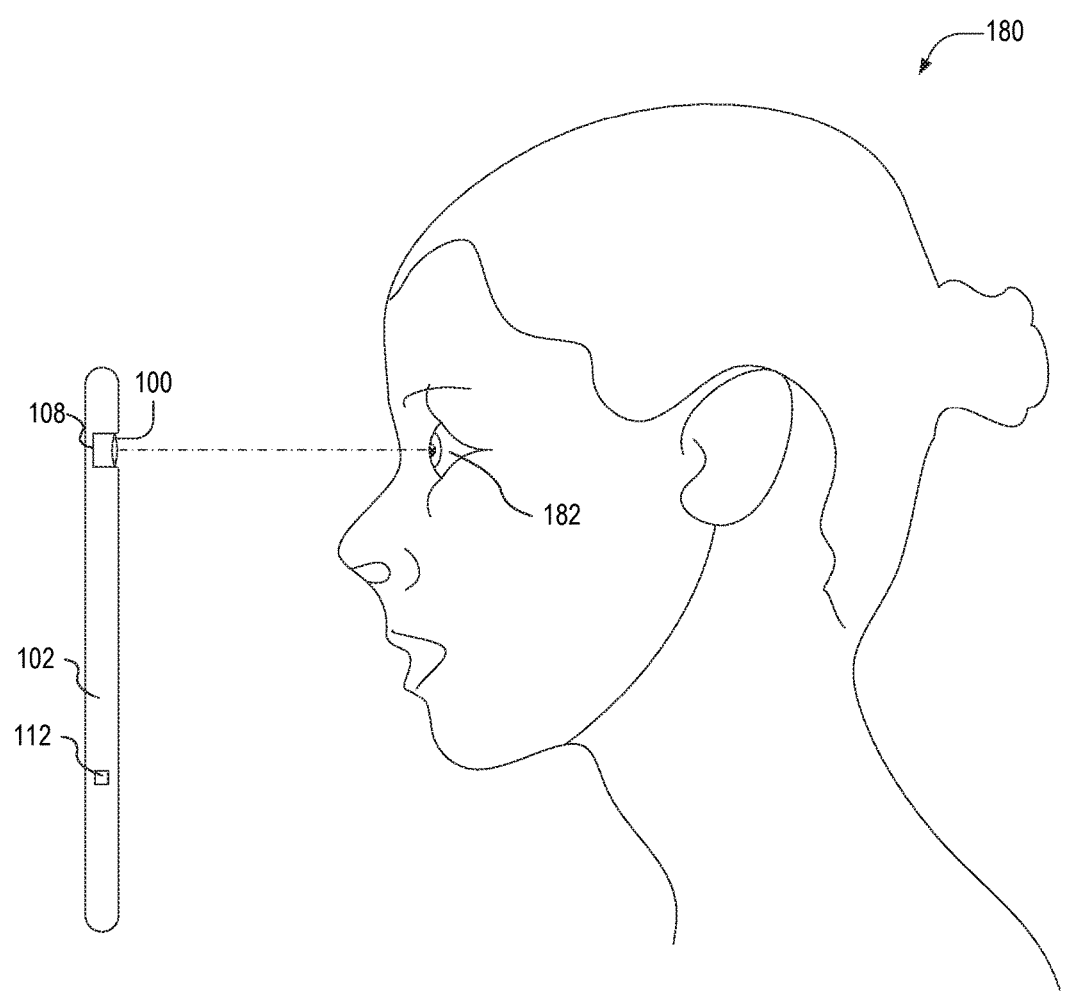
FIG. 1 illustrates a six-aspheric-surface lens in a use scenario, according to an embodiment.

FIG. 1 illustrates a six-aspheric-surface lens 100 in an exemplary use scenario. Lens 100 is part of camera 108 of a mobile device 102. Lens 100 has a relatively narrow FOV and is capable of imaging this FOV with high resolution. Thus, lens 100 is suitable for iris recognition applications. An eye 182 of a subject 180 is in the field of view of camera 108, such that camera 108 of mobile device 102 may capture an image 112 of eye 182. Image 112 is stored within a memory of mobile device 102 for example. In one exemplary use scenario, mobile device 102 processes image 112 to determine if subject 180 should be allowed access to mobile device 102.

Figure 2:
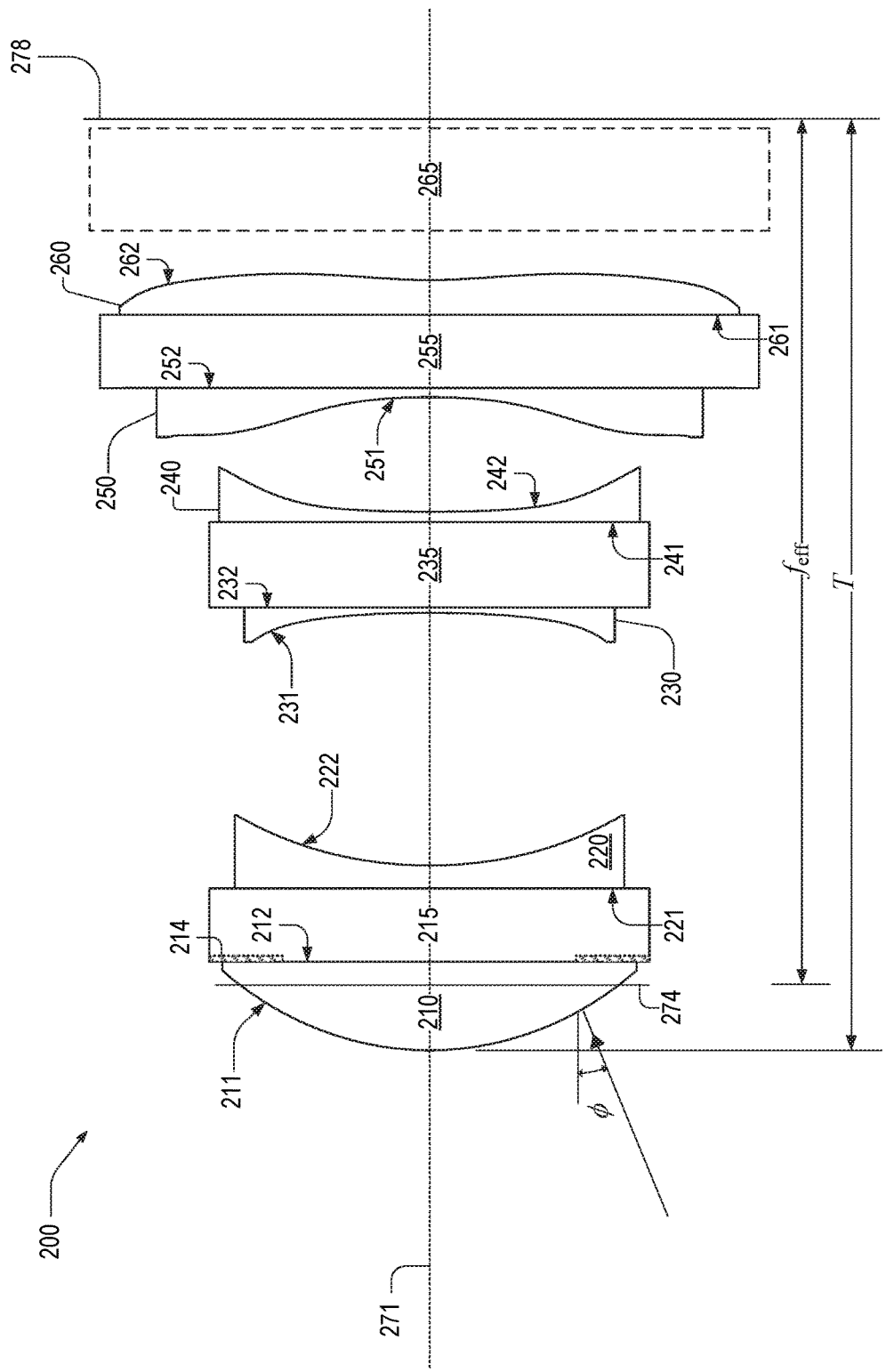
FIG. 2 is a cross-sectional view of an embodiment of the six-aspheric-surface lens of FIG. 1.

FIG. 2 is a cross-sectional view of a six-aspheric-surface lens 200, which is an embodiment of six-aspheric-surface lens 100 of FIG. 1. Six-aspheric-surface lens 200 includes six coaxially aligned lenses: a first lens 210, a second lens 220, a third lens 230, a fourth lens 240, a fifth lens 250, and a sixth lens 260. Lens 200 also includes biplanar substrates 215, 235, and 255. Substrate 215 is between lenses 210 and 220. Substrate 235 is between lenses 230 and 240. Substrate 255 is between lenses 250 and 260. Lenses 210, 220, 230, 240, 250, and 260 have respective object-side surfaces 211, 221, 231, 241, 251, and 261 and respective image-side surfaces 212, 222, 232, 242, 252, and 262.

First lens 210 is a positive lens. Second lens 220, third lens 230, and fourth lens 240, and fifth lens 250 are each negative lenses. Surface 261 of lens 260 is planar and surface 262 of lens 260 includes both convex and concave regions and is hence a "gull-wing surface." Accordingly, lens 260 is an example of a "plano-gull-wing lens." The six aspheric surfaces referred to by "six-aspheric-surface lens" are the non-planar surface of each lens thereof: surfaces 211, 222, 231, 242, 251, and 262.

Six-aspheric-surface lens 200 has an aperture stop 241. Aperture stop 214 is, for example, between lenses 210 and 220. Such a location of aperture stop 214 enables elements of lens 200 to have a smaller diameter compared to when aperture stop is closer to lens 260. Aperture stop 214 may be an opaque coating between lens 210 and substrate 215.

In an embodiment, each aspheric surface of lens 200 performs one or more particular functions. A function of surface 211 of first lens 210 is to collect incident light thereon and refract it through aperture stop 214. A function of aspheric surfaces 222 and 231 of second lens 220 and third lens 230, respectively, is to correct chromatic aberration and spherical aberration. A function of aspheric surface 242 of fourth lens 240 is to converge light incident thereon and refract it to aspheric surface 251 of fifth lens 250. The optical power of fourth lens 240, determined at least in part by the radius of curvature of surface 242, primarily determines overall length of lens 200. For example, the optical power of fourth lens 240 may be configured to reduce total track length T of six-aspheric-surface lens 200. A function of aspheric surfaces 251 and 262 of fifth lens 250 and sixth lens 260 is to balance and correct aberrations accumulated in wavefronts incident thereon. Such aberrations include distortion, astigmatism, and coma.

Six-aspheric-surface lens 200 may also include a coverglass 265. When included in six-aspheric-surface lens 200, coverglass 265 covers a pixel array of an image sensor, not shown, located at image plane 278. The specific type of pixel array and image sensor may vary and is thus not discussed in detail herein. Alternatively, an embodiment of six-aspheric-surface lens 200 not including coverglass 265 may be configured to cooperate with a coverglass 265 to image a scene onto an image sensor to which coverglass 265 is bonded.

In an embodiment, at least part of the manufacturing of six-aspheric-surface lens 200 is performed at the wafer-level using a wafer-level optics replication process. In this embodiment, (a) lenses 210 and 220 and optionally stop aperture 214 are molded on substrate 215, (b) lenses 230 and 240 are molded on substrate 235, and/or (c) lenses 250 and 260 are molded on substrate 255. Lenses 210, 220, 230, 240, 250, and 260 may be formed of a solder-reflow compatible material via such a wafer-level optics replication process, such that a camera module, including six-aspheric-surface lens 200 and an image sensor coupled therewith, may be surface-mounted to a circuit board via a solder-reflow process. A solder-reflow compatible material for example withstands surface-mount technology (SMT) reflow soldering processes occurring at temperatures exceeding 250° C. Examples of such material include NT-UV Series UV-curing resins by Nitto Denko Corporation (Osaka, Japan).

Lenses 210, 220, 230, 240, 250, and 260 may also be formed via injection molding or other methods known in the art. Alternatively, lenses 210, 220, 230, 240, 250, and 260 may be formed from glass via precision glass molding (also known as ultra-precision glass pressing) or other methods known in the art.

At least one of lenses 210, 220, 230, 240, 250, and 260 may be a singlet lens. At least one of lenses 210, 220, 230, 240, 250, and 260 may be a non-singlet lens without departing from the scope hereof.

Six-aspheric-surface lens 200 has a FOV 2φ, which corresponds to two times a maximum angle φ of an incident ray on the front surface of six-aspheric-surface lens 200 that allows for propagation of the incident ray through aperture stop 214 to image plane 278. Angle φ is defined with respect to optical axis 271. The front surface is, for example, surface 211.

FIG. 2 shows lenses of six-aspheric surface lens 200 with minimum respective diameters required for propagation of light from within FOV 2φ to image plane 278. Without departing from the scope hereof, one or more elements of six-aspheric surface lens 200 may have larger diameter than what is shown in FIG. 2. Furthermore, the cross section of elements of six-aspheric surface lens 200 may be rectangular or square. For example, if produced via wafer-level optics replication, each of lenses 210 and 220 and substrate 215 may have the same square cross section resulting from a dicing operation performed after molding lenses 210 and 220 on substrate 215.

Six-aspheric-surface lens 200 has an effective focal length $f_{eff}$ between a principal plane 274 and image plane 278. Principal plane 274 may be in a different location than what is indicated in FIG. 2, without departing from the scope hereof. Six-aspheric-surface lens 200 has a total track length T between surface 211 and image plane 278. Embodiments of six-aspheric-surface lens 200 may have a quotient $T/f_{eff}$ between 0.9 and 1.1. Limiting the quotient $T/f_{eff}$ to this range limits total track length T such that it can fit in mobile device 102, for example.

First lens 210 has a focal length $f_1$ and second lens 220 has a focal length $f_2$. An embodiment of six-aspheric-surface lens 200 has a quotient $f_1/f_2$ between −0.27 and −0.17 for correcting chromatic and spherical aberration. Third lens 230 has a focal length $f_3$ and fourth lens 240 has a focal length $f_4$. In an embodiment of six-aspheric-surface lens 200, focal lengths $f_3$ and $f_4$ satisfy $-0.6 < f_{eff}(f_3+f_4)/(f_3 f_4) < -0.3$ for correcting chromatic aberration and limiting total track length T.

Fifth lens 250 has a focal length $f_5$ and sixth lens 260 has a focal length $f_6$. In an embodiment of six-aspheric-surface lens 200, focal lengths $f_5$ and $f_6$ satisfy $1.1 < |f_{eff}(f_5+f_6)/(f_5 f_6)| < 1.25$ for limiting aberrations such as coma, astigmatism, and distortion in images formed by six-aspheric-surface lens 200.

Lenses 210, 220, 230, 240, 250, and 260 are formed of materials having, respectively, a first Abbe number $V_1$, a second Abbe number $V_2$, a third Abbe number $V_3$, a fourth Abbe number $V_4$, a fifth Abbe number $V_5$, and a sixth Abbe number $V_6$. Unless otherwise specified, Abbe numbers $V_d$ herein are computed at the blue, green, and red Fraunhofer F-, d- and C-spectral lines: $\lambda_F=486.1$ nm, $\lambda_d=587.6$ nm, and $\lambda_C=656.3$ nm respectively, and refractive index values correspond to $\lambda_d$. In six-aspheric-surface lens 200, Abbe number $V_1$ may exceed each Abbe number $V_2$ and $V_3$. In one example, Abbe number $V_1$ exceeds 50 and Abbe numbers $V_2$ and $V_3$ are each less than 35. These constraints on Abbe numbers allow for limiting chromatic aberration (e.g., axial color and lateral color) in images formed by six-aspheric-surface lens 200.

Transparent optical materials with $V_d>48$ include polymethyl methacrylate (PMMA), alicyclic acrylate (e.g., Optrez OZ1230(1)®), and cycloolefin polymers (e.g., APEL™ 5014DP, TOPAS® 5013, ZEONEX® 480R, and Arton FX4727). A lens material with $V_d>48$ may be plastic or non-plastic optical material, such as glass, without departing from the scope hereof.

Transparent optical materials with $V_d<35$ include PANILITE® (a brand-name polycarbonate), Udel® P-1700 (a brand-name polysulfone), and OKP-4 (a brand-name optical polyester). A lens material with $V_d<35$ may be plastic or a non-plastic optical material, such as glass, without departing from the scope hereof.

Six-Aspheric-Surface Lens, Example 1

Figure 3:
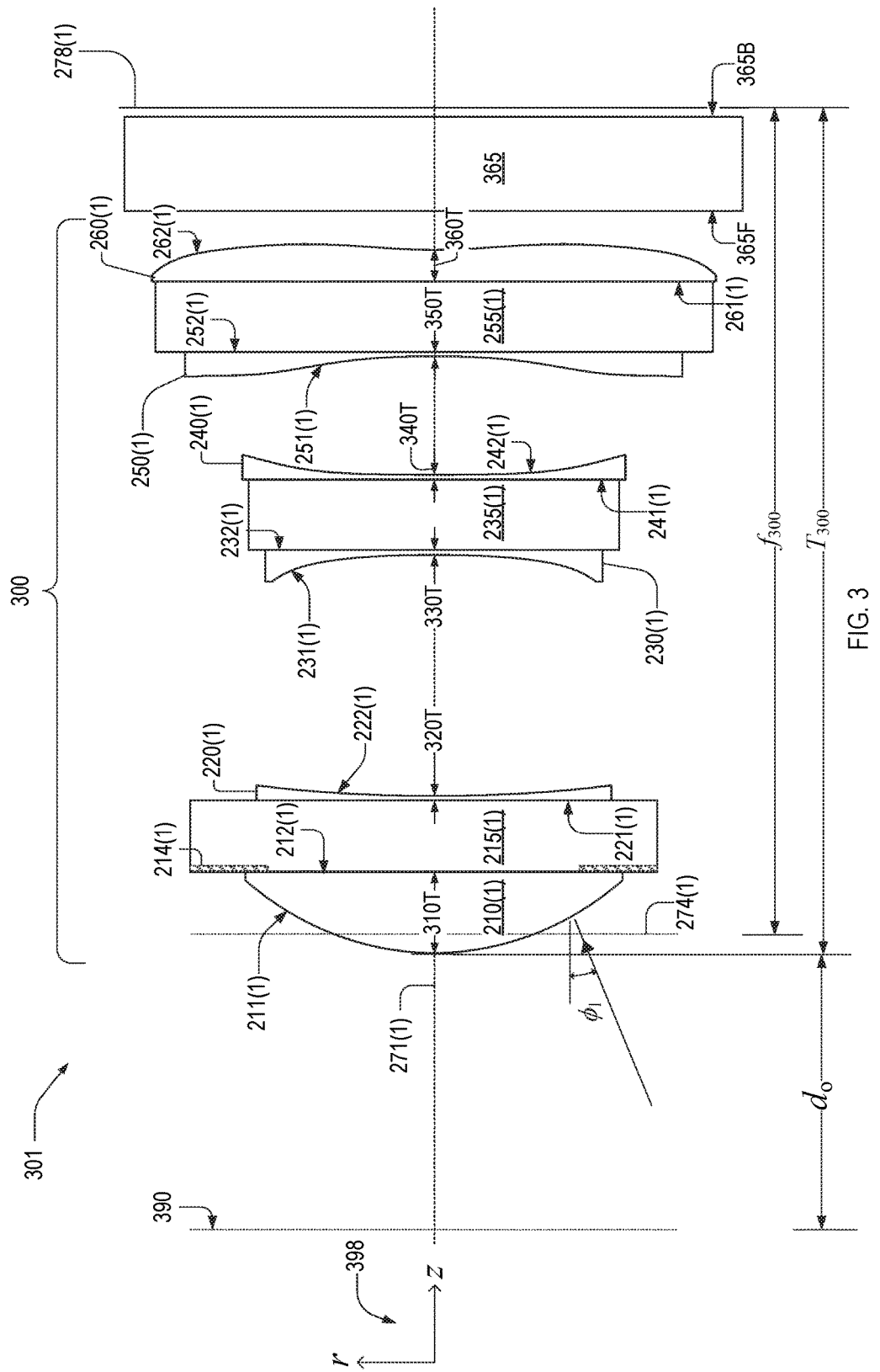
FIG. 3 is a cross-sectional view of an imaging system that includes a first embodiment of the six-aspheric-surface lens of FIG. 2.

FIG. 3 is a cross-sectional view of a six-aspheric-surface lens 300, which is an embodiment of six-aspheric-surface lens 200. Six-aspheric-surface lens 300 includes substrates 215(1), 235(1), and 255(1), a first lens 210(1), an aperture stop 214(1), a second lens 220(1), a third lens 230(1), a fourth lens 240(1), a fifth lens 250(1), and a sixth lens 260(1). Lenses 210(1), 220(1), 230(1), 240(1), and 250(1) have respective planar surfaces 212(1), 221(1), 232(1), 241(1), and 252(1) and respective non-planar surfaces 211(1), 222(1), 231(1), 242(1), and 251(1). Lens 260(1) has a planar surface 261(1) and a gull-wing surface 262(1). Lenses 210(1), 220(1), 230(1), 240(1), 250(1), and 260(1) are coaxial with a common optical axis 271(1). Six-aspheric-surface lens 300 may also include a coverglass 365, which is an example of coverglass 265. Coverglass 365 has a front surface 365F and a back surface 365B.

Herein, a figure element denoted by a reference numeral suffixed by a parenthetical numeral indicates an example of the element indicated by the reference numeral. For example, lens 210(1) of FIG. 3 is an example of lens 210 of FIG. 2.

FIG. 4 shows a table 400 of exemplary parameters of surfaces and substrates of six-aspheric-surface lens 300. Table 400 includes columns 404, 406, 408, 410, and 421-427. Column 421 denotes substrates 215(1), 235(1), and 255(1), surfaces 211(1), 212(1), 221(1), 222(1), 231(1), 232(1), 241(1), 242(1), 251(1), 252(1), 261(1), 262(1), 365F and 365B, aperture stop 214(1), and image plane 278(1).

Column 423 includes thicknesses, in millimeters, of substrates listed in column 421 and between adjacent surfaces listed in column 421. Lenses 210(1), 220(1), 230(1), 240(1), 250(1), and 260(1) have respective center thicknesses 310T, 320T, 330T, 340T, 350T, and 360T. A center thickness value in column 423 in a row denoting a specific surface indicates the distance, on optical axis 271(1), between that specific surface and the next surface. For example, on optical axis 271(1), surfaces 211(1) and 212(1) are separated by 0.3450 mm, which corresponds to center thickness 310T of lens 210(1). On optical axis 271(1), surfaces 221(1) and 222(1) are separated by 0.0250 mm, which corresponds to center thickness 320T of lens 220(1).

Column 424 indicates the minimum diameter of each surface sufficient for a ray incident on surface 211(1), and within FOV $2\phi_1$, that passes through aperture stop 214(1) to pass through that surface. Aperture stop 214(1) has a diameter $\phi_{214(1)}$=1.574 mm. Without departing from the scope hereof, one or more surfaces of six-aspheric surface lens 300 may have larger diameter than its minimum diameter of column 424.

It should be appreciated that imaging system 301 need not include coverglass 365, in which case image plane 278(1) shifts toward six-aspheric-surface lens 300.

Surfaces 222(1), 231(1), and 251(1) have surface sag $z_{sag}$, shown in Eqn. 1.

$$z_{sag} = \frac{cr^2}{1 + \sqrt{1 - (1+k)c^2r^2}} + \sum_{i=1}^{N} \alpha_{2i} r^{2i} \quad (1)$$

In Eqn. 1, $z_{sag}$ is a function of radial coordinate r, where directions z and r are shown in a coordinate system 398, FIG. 3. Quantity i is a positive integer and N=5. In Eqn. 1, the parameter c is the reciprocal of the surface radius of curvature $r_c$:

$$c = \frac{1}{r_c}.$$

Column 422 of Table 400 includes finite $r_c$ values for surfaces 211(1), 222(1), 231(1), 242(1), 251(1), and 262(1). Parameter k denotes the conic constant, shown in column 427. Columns 404, 406, 408, and 410 contain values of aspheric coefficients $\alpha_4$, $\alpha_6$, $\alpha_8$, and $\alpha_{10}$ respectively. The units of quantities in table 400 are consistent with $z_{sag}$ in Eqn. 1 being expressed in millimeters.

Column 425 lists values of material refractive index $n_d$ at free-space wavelength $\lambda$=587.3 nm, and column 426 lists the corresponding Abbe numbers $V_d$. Since non-dispersive media have an undefined Abbe number, corresponding table cells of in column 426 are empty. The refractive index and Abbe number values corresponding to a surface characterize the material between this specific surface and the surface in the row beneath. For example, the refractive index and Abbe number between surface 221(1) and 222(1) are 1.590 and 31, respectively. Lenses 210(1) and 250(1) have Abbe number $V_d$=57 and may be formed of the same material. Lenses 220(1) and 230(1) have Abbe number $V_d$=31 and may be formed of the same material. Similarly, substrates 215(1), 235(1), and 255(1) may be formed of the same material.

Six-aspheric-surface lens 300 has a working f-number equal to 2.2 and a field of view $2\phi_1$=35 degrees. At free-space wavelength $\lambda_0$=587.6 nm, six-aspheric-surface lens 300 has an effective focal length $f_{300}$=3.732 mm between a principal plane 274(1) and image plane 278(1). Six-aspheric-surface lens 300 has a total track length $T_{300}$=3.825 mm between surface 211(1) and image plane 278(1). The ratio of total track length to effective focal length is $T_{300}/f_{300}$=1.02.

Six-aspheric-surface lens 300 has a working f-number equal to 2.2 and a field of view $2\phi_1$=35 degrees. At free-space wavelength $\lambda$=587.3 nm, six-aspheric-surface lens 300 has an effective focal length $f_{300}$=3.732 mm between a principal plane 274(1) and image plane 278(1). Six-aspheric-surface lens 300 has a total track length $T_{300}$=3.825 mm between surface 211(1) and image plane 278(1). The ratio of total track length to effective focal length is $T_{300}/f_{300}$=1.02.

Third lens 230(1) and fourth lens 240(1) have respective focal lengths $f_3$ and $f_4$, which may be approximated using the lensmaker's equation. Object-side surface 231(1) of third lens 230(1) has a −5.25-mm radius of curvature, and image-side surface 232(1) is has an infinite radius of curvature. Using these radii of curvature, center thickness 330T, and $n_d$=1.59, the lensmaker's equation yields $f_3 \approx -8.90$ mm. Object-side surface 241(1) of fourth lens 240(1) has an infinite radius of curvature, and image-side surface 242(1) has a 13.95-mm radius of curvature. Using these radii of curvature, center thickness 340T, and $n_d$=1.520, the lensmaker's equation yields $f_4 \approx -26.82$ mm. Quotient $f_{300}(f_3+f_4)/(f_3 f_4)$ is approximately −0.51.

Fifth lens 250(1) and sixth lens 260(1) have respective focal lengths $f_5$ and $f_6$, which may be approximated using the lensmaker's equation. Object-side surface 251(1) of fifth lens 250(1) has a −5.08-mm radius of curvature, and image-side surface 252(1) is has an infinite radius of curvature. Using these radii of curvature, center thickness 350T, and $n_d$=1.511, the lensmaker's equation yields $f_5 \approx 9.95$ mm. Object-side surface 261(1) of sixth lens 260(1) has an infinite radius of curvature, and image-side surface 262(1) has a 2.30-mm radius of curvature. Using these radii of curvature, center thickness 360T, and $n_d$=1.520, the lensmaker's equation yields $f_6 \approx -4.42$ mm. Quotient $|f_{300}(f_5+f_6)/(f_5 f_6)|$ is approximately 1.10.

FIGS. 5-8 illustrate performance of six-aspheric-surface lens 300, as computed by Zemax® optical design software. Specifically, FIGS. 5-8 are plots of longitudinal aberration, f-theta distortion, field curvature, and lateral color, respectively, of images of a surface 390 formed by aspheric-surface lens 300 within imaging system 301. Surface 390 is located at a distance $d_0$=25 cm from surface 211(1) on optical axis 271(1). Distance $d_0$ is representative of iris recognition imaging scenarios.

Figure 5:
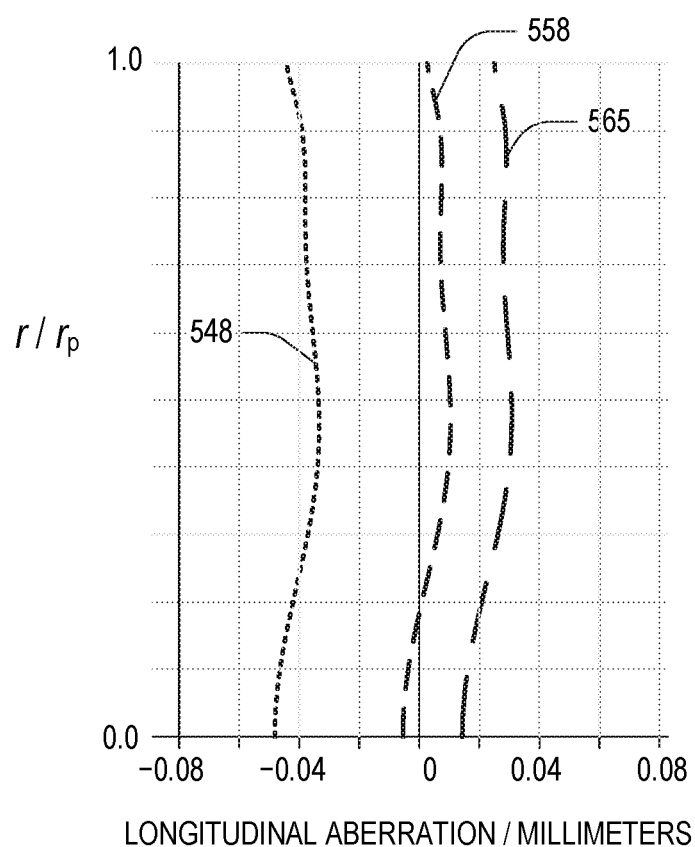
FIG. 5 is a plot of longitudinal aberration of the six-aspheric-surface lens within the imaging system of FIG. 3, according to the parameters of FIG. 4.

FIG. 5 is a plot of the longitudinal aberration of six-aspheric-surface lens 300. In FIG. 5, longitudinal aberration is plotted in units of millimeters as a function of normalized radial coordinate $r/r_p$, where $r_p$=0.8742 mm is the maximum entrance pupil radius. Longitudinal aberration curves 548, 558, and 565 are computed at wavelengths $\lambda_F$, $\lambda_d$, and $\lambda_C$, respectively.

Figure 6:
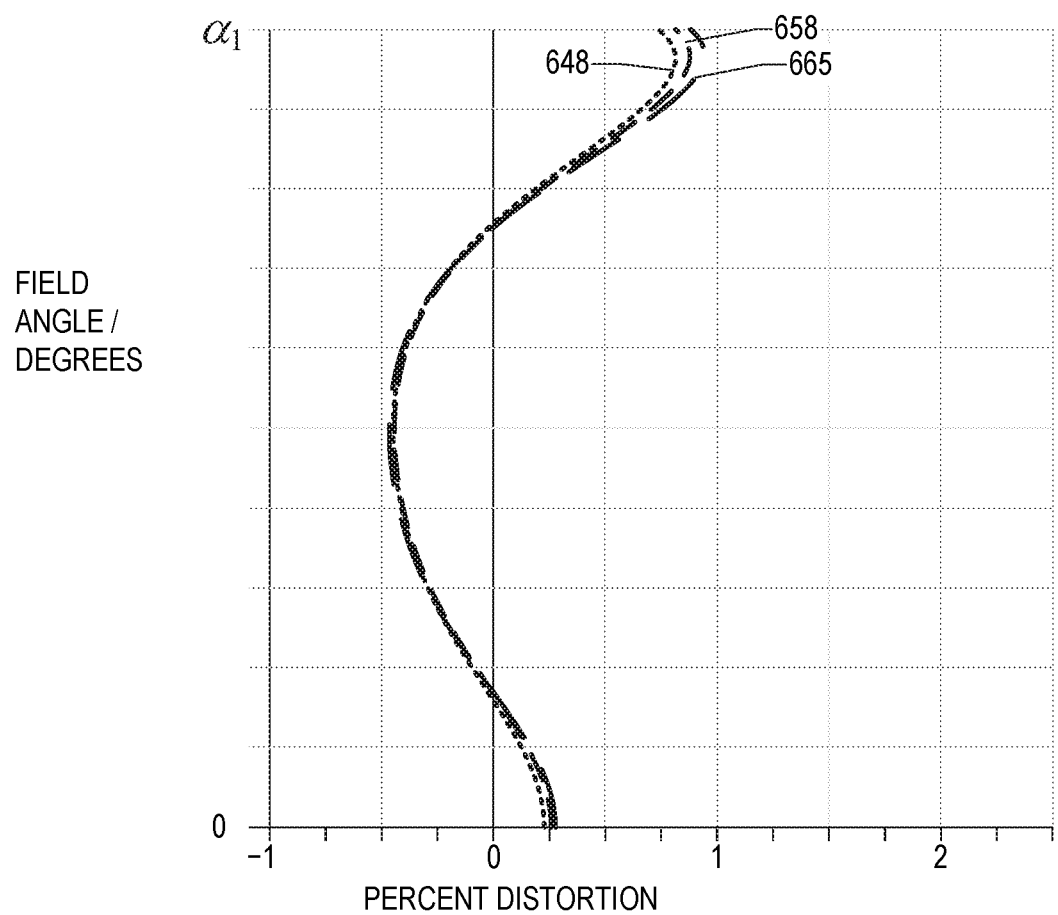
FIG. 6 is a plot of f-theta distortion of the six-aspheric-surface lens within the imaging system of FIG. 3, according to the parameters of FIG. 4.

FIG. 6 is a plot of the f-theta distortion, versus field angle, of six-aspheric-surface lens 300. The maximum field angle plotted in FIG. 6 is $\alpha_1$=17.506°, which is half of lens 300's field of view. Distortion curves 648, 658, and 665 are computed at wavelengths $\lambda_F$, $\lambda_d$, and $\lambda_C$, respectively.

Figure 7:
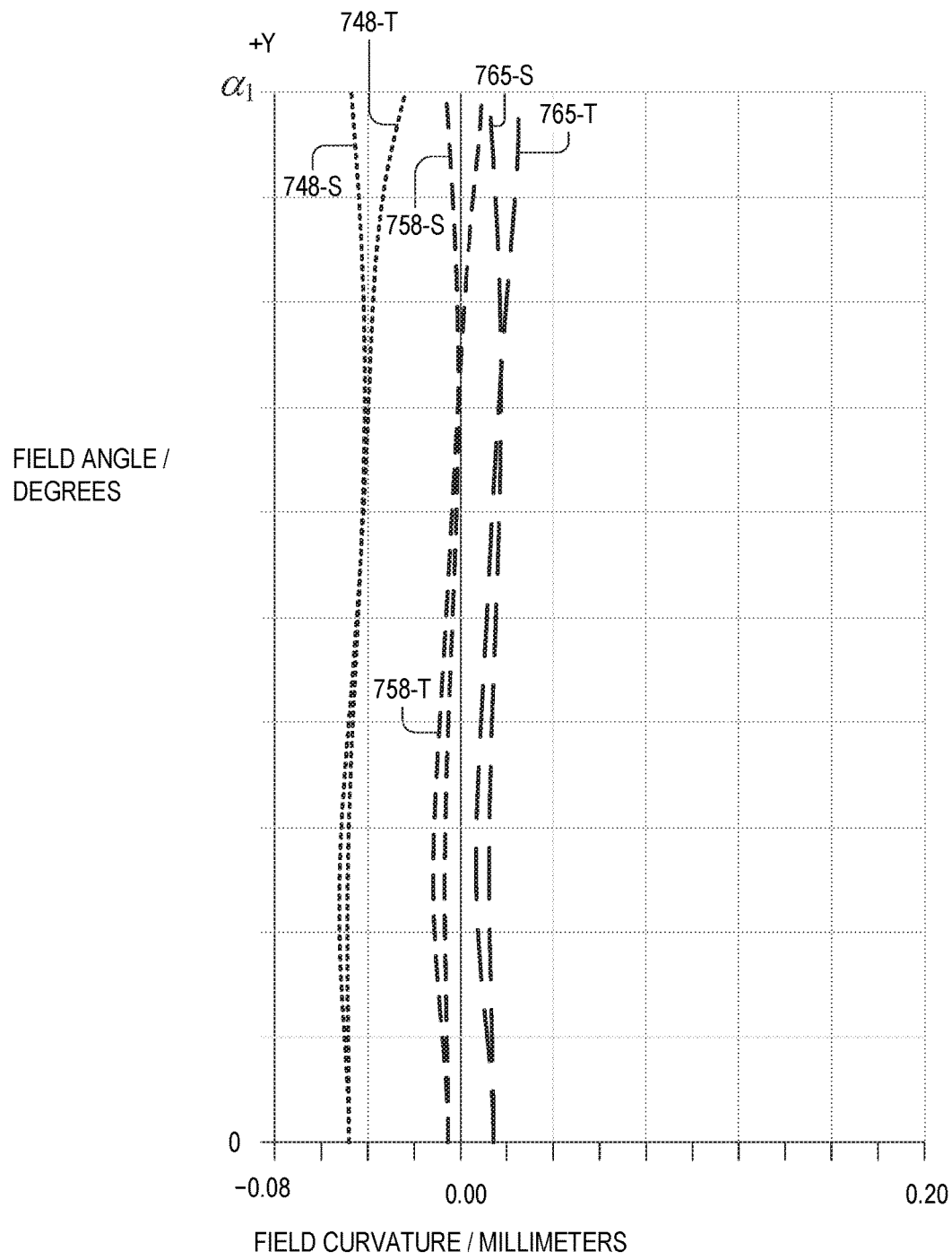
FIG. 7 is a plot of field curvature of the six-aspheric-surface lens within the imaging system of FIG. 3, according to the parameters of FIG. 4.

FIG. 7 is a plot of the Petzval field curvature, as a function of field angle, of six-aspheric-surface lens 300. The field curvature is plotted for field angles between zero and $\alpha_1$. Field curvature 748-S and field curvature 748-T (short-dashed lines) are computed at wavelength $\lambda_F$ in the sagittal and tangential planes, respectively. Field curvature 758-S and field curvature 758-T (medium-dashed lines) are computed at wavelength $\lambda_d$ in the sagittal and tangential planes, respectively. Field curvature 765-S and field curvature 765-T (long-dashed lines) correspond to field curvature at wavelength $\lambda_C$ in the sagittal and tangential planes, respectively.

Figure 8:
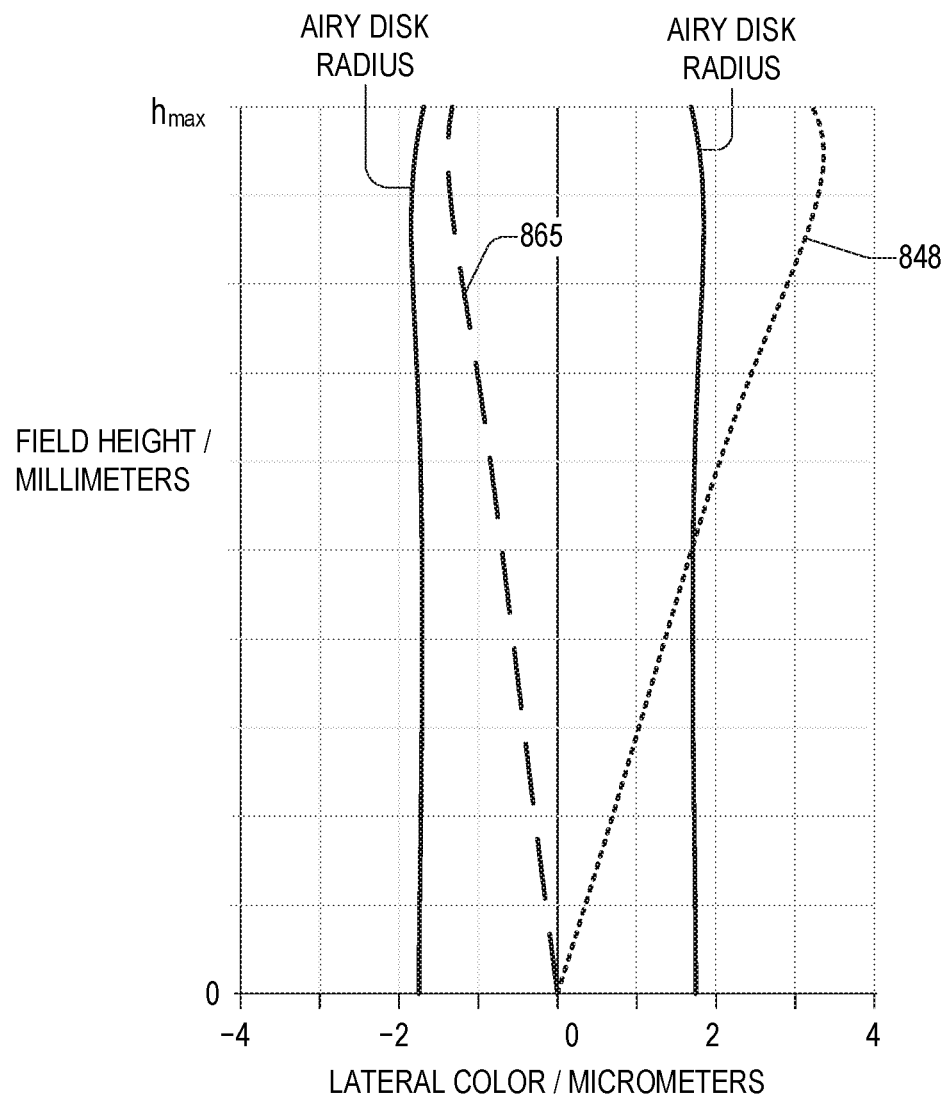
FIG. 8 is a plot of lateral color error of the six-aspheric-surface lens within the imaging system of FIG. 3, according to the parameters of FIG. 4.

FIG. 8 is a plot of the lateral color error, also known as transverse chromatic aberration, versus field height of six-aspheric-surface lens 300. Field height ranges from $h_{min}$=0 (on-axis) to $h_{max}$=1.234 mm in image plane 278(1). Lateral color is referenced to $\lambda_d$, and hence the lateral color for $\lambda_d$ is zero for all field heights. Lateral color 848 is computed at wavelength $\lambda_F$. Lateral color 865 is computed at wavelength $\lambda_C$.

Six-Aspheric-Surface Lens, Example 2

Figure 9:
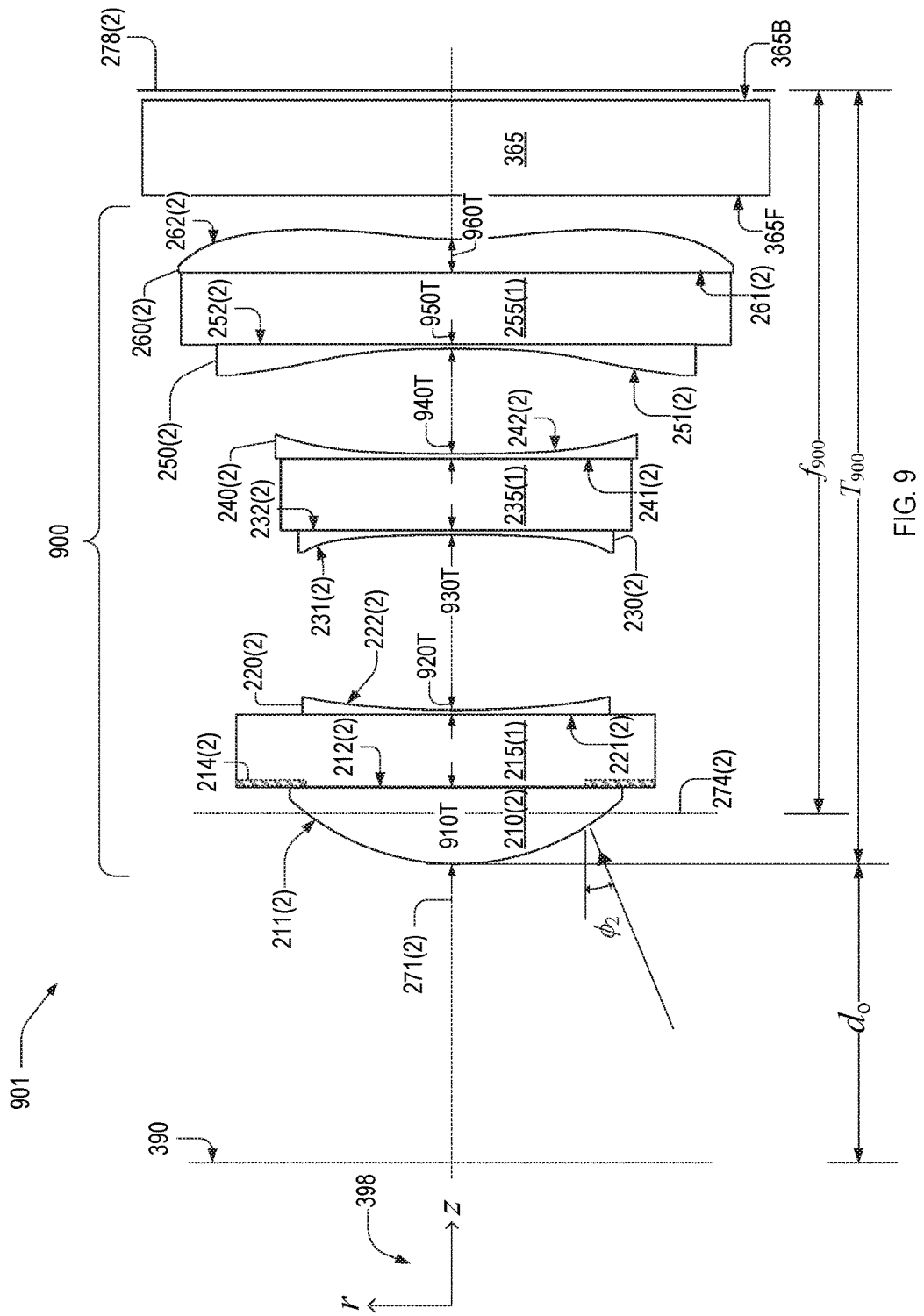
FIG. 9 is a cross-sectional view of an imaging system that includes a second embodiment of the six-aspheric-surface lens of FIG. 2.

FIG. 9 is a cross-sectional view of a six-aspheric-surface lens 900, which is an embodiment of six-aspheric-surface lens 200. Six-aspheric-surface lens 900 includes substrates 215(1), 235(1), and 255(1), a first lens 210(2), an aperture stop 214(2), a second lens 220(2), a third lens 230(2), a fourth lens 240(2), a fifth lens 250(2), a sixth lens 260(2). Lenses 210(2), 220(2), 230(2), 240(2), and 250(2) have respective planar surfaces 212(2), 221(2), 232(2), 241(2), and 252(2) and respective non-planar surfaces 211(2), 222(2), 231(2), 242(2), and 251(2). Lens 260(2) has a planar surface 261(2) and a gull-wing surface 262(2). Lenses 210(2), 220(2), 230(2), 240(2), 250(2), and 260(2) are coaxial with a common optical axis 271(2). Six-aspheric-surface lens 900 may also include coverglass 365.

Figure 10:
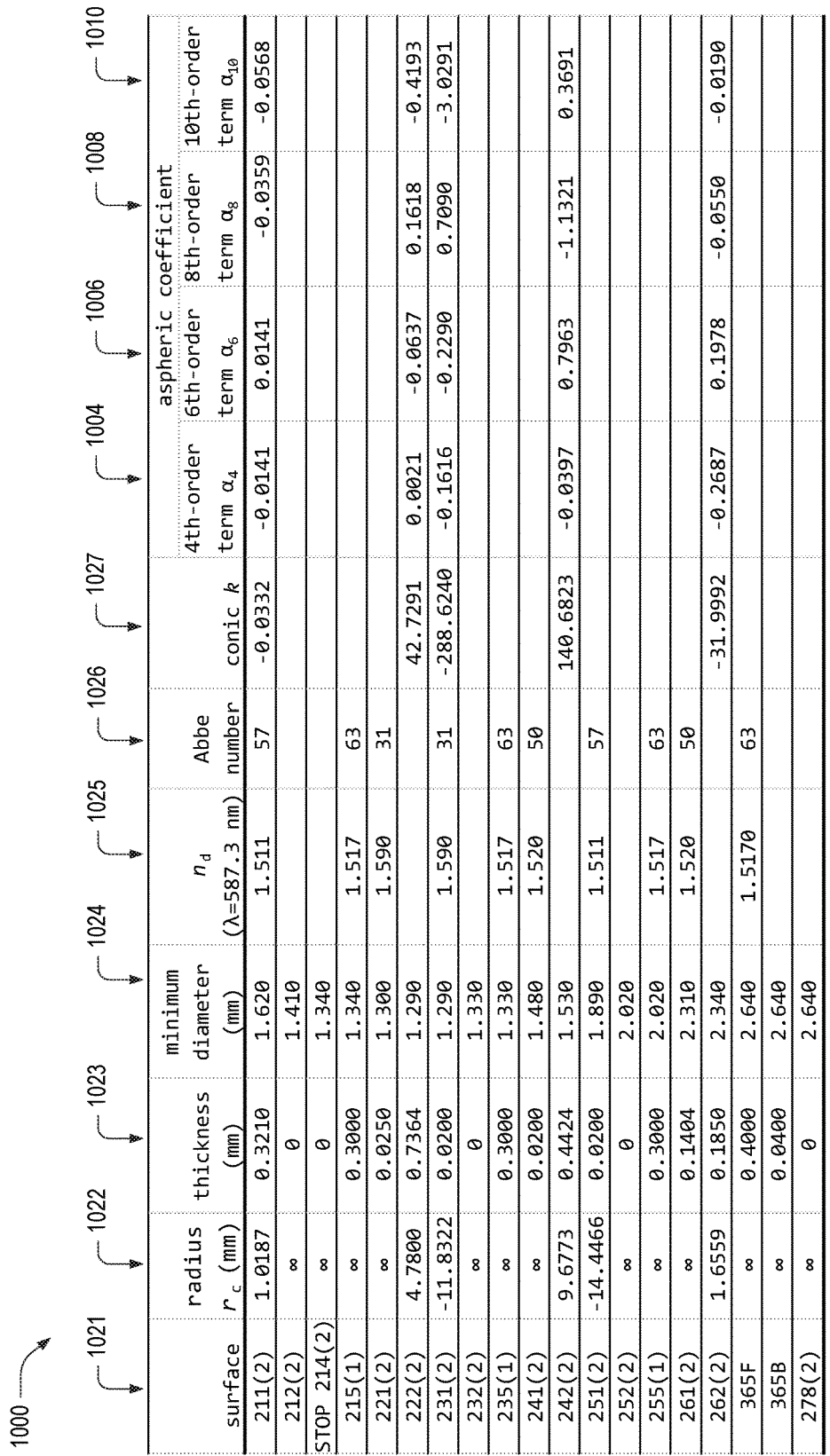
FIG. 10 shows a table of exemplary parameters of the six-aspheric-surface lens of FIG. 9.

FIG. 10 shows a table 1000 of exemplary parameters of surfaces and substrates of six-aspheric-surface lens 900. Table 1000 includes columns 1004, 1006, 1008, 1010, and 1021-1027. Column 1021 denotes substrates 215(1), 235(1), and 255(1), surfaces 221(2), 222(2), 231(2), 232(2), 251(2), 252(2), 261(2), 262(2), aperture stop 214(2), and image plane 278(2). Column 1023 includes thickness values, in millimeters, between adjacent surfaces of six-aspheric-surface lens 900 on optical axis 271(2).

Column 1023 includes thicknesses, in millimeters, of substrates listed on column 1021 and between adjacent surfaces listed in column 1021. Lenses 210(2), 220(2), 230(2), 240(2), 250(2), and 260(2) have respective center thicknesses 910T, 920T, 930T, 940T, 950T, and 960T. A center thickness value in column 1023 in a row denoting a specific surface indicates the distance, on optical axis 271 (2), between that specific surface and the next surface. For example, on optical axis 271(2), surfaces 211(2) and 212(2) are separated by 0.3450 mm, which corresponds to center thickness 910T of lens 210(2). On optical axis 271(2), surfaces 221(2) and 222(2) are separated by 0.0250 mm, which corresponds to center thickness 920T of lens 220(2).

Column 1024 indicates the minimum diameter of each surface sufficient for a ray incident on surface 211(2), and within FOV $2\phi_2$, that passes through aperture stop 214(2) to pass through that surface. Aperture stop 214(2) has a diameter $\phi_{214(2)}$=1.34 mm. Without departing from the scope hereof, one or more surfaces of six-aspheric surface lens 900 may have larger diameter than its minimum diameter of column 1024.

It should be appreciated that imaging system 901 need not include coverglass 365, in which case image plane 278(2) shifts toward six-aspheric-surface lens 900.

Surfaces 222(2), 231(2), and 251(2) have surface sag $z_{sag}$, shown in Eqn. 1. Column 1022 of Table 1000 includes finite $r_c$ values for surfaces 211(2), 222(2), 231(2), 242(2), 251(2), and 262(2). Parameter k denotes the conic constant, shown in column 1027. Columns 1004, 1006, 1008, and 1010 contain values of aspheric coefficients $\alpha_4$, $\alpha_6$, $\alpha_8$, and $\alpha_{10}$ respectively. The units of quantities in table 1000 are consistent with $z_{sag}$ in Eqn. 1 being expressed in millimeters.

Column 1025 lists values of material refractive index $n_d$ at free-space wavelength $\lambda$×587.3 nm, and column 1026 lists the corresponding Abbe numbers $V_d$. Since non-dispersive media have an undefined Abbe number, corresponding table cells of column 426 are empty. As in table 1000, the refractive index and Abbe number values corresponding to a surface characterize the material between the surface and the surface in the row beneath. Lenses 210(2) and 250(2) have Abbe number $V_d$=57 and may be formed of the same material. Lenses 220(2) and 230(2) have Abbe number $V_d$=31 and may be formed of the same material. Similarly, substrates 215(1), 235(1), and 255(1) may be formed of the same material.

Six-aspheric-surface lens 900 has a working f-number equal to 2.2 and a field of view $2\phi_2$=40 degrees. At free-space wavelength $\lambda$×587.3 nm, six-aspheric-surface lens 900 has an effective focal length $f_{900}$=3.252 mm between a principal plane 274(2) and image plane 278(2). Six-aspheric-surface lens 900 has a total track length $T_{900}$=3.4752 mm between surface 211(2) and image plane 278(2). The ratio of total track length to effective focal length is $T_{900}/f_{900}$=1.07.

First lens 210(2) and second lens 220(2) have respective focal lengths $f_1$ and $f_2$, which may be approximated using the lensmaker's equation. Object-side surface 211(2) of first lens 210(2) has a 1.02-mm radius of curvature, and image-side surface 212(2) is has an infinite radius of curvature. Using these radii of curvature, center thickness 910T, and $n_d$=1.511, the lensmaker's equation yields $f_1 \approx 2.1$ mm. Object-side surface 221(2) of second lens 220(2) has an infinite radius of curvature, and image-side surface 222(2) has a 4.78-mm radius of curvature. Using these radii of curvature, center thickness 920T, and $n_d$=1.590, the lensmaker's equation yields $f_2 \approx -9.2$ mm. Ratio $f_1/f_2$ is approximately −0.23.

Third lens 230(2) and fourth lens 240(2) have respective focal lengths $f_3$ and $f_4$, which may be approximated using the lensmaker's equation. Object-side surface 231(2) of third lens 230(2) has a −11.8-mm radius of curvature, and image-side surface 232(2) is has an infinite radius of curvature. Using these radii of curvature, center thickness 930T, and $n_d$=1.59, the lensmaker's equation yields $f_3 \approx -20.1$ mm.

Object-side surface 241(2) of fourth lens 240(2) has an infinite radius of curvature, and image-side surface 242(2) has a 9.68-mm radius of curvature. Using these radii of curvature, center thickness 940T, and $n_d$=1.520, the lensmaker's equation yields $f_4 \approx -18.6$ mm. Quotient $f_{900}(f_3+f_4)/(f_3 f_4)$ is approximately −0.34.

Fifth lens 250(2) and sixth lens 260(2) have respective focal lengths $f_5$ and $f_6$, which may be approximated using the lensmaker's equation. Object-side surface 251(2) of fifth lens 250(2) has a −14.4-mm radius of curvature, and image-side surface 252(2) is has an infinite radius of curvature. Using these radii of curvature, center thickness 950T, and $n_d$=1.511, the lensmaker's equation yields $f_5 \approx -28.3$ mm. Object-side surface 261(2) of sixth lens 260(2) has an infinite radius of curvature, and image-side surface 262(2) has a 1.66-mm radius of curvature. Using these radii of curvature, center thickness 960T, and $n_d$=1.520, the lensmaker's equation yields $f_6 \approx -3.18$ mm. Quotient $|f_{900}(f_5+f_6)/(f_5 f_6)|$ is approximately 1.18.

FIGS. 11-14 illustrate performance of six-aspheric-surface lens 900, as computed by Zemax® optical design software. Specifically, FIGS. 11-14 are plots of longitudinal aberration, f-theta distortion, field curvature, and lateral color, respectively, of images of a surface 390 formed by aspheric-surface lens 900 within imaging system 901. Surface 390 is located at a distance $d_0$=25 cm from surface 211(1) on optical axis 271(1).

Figure 11:
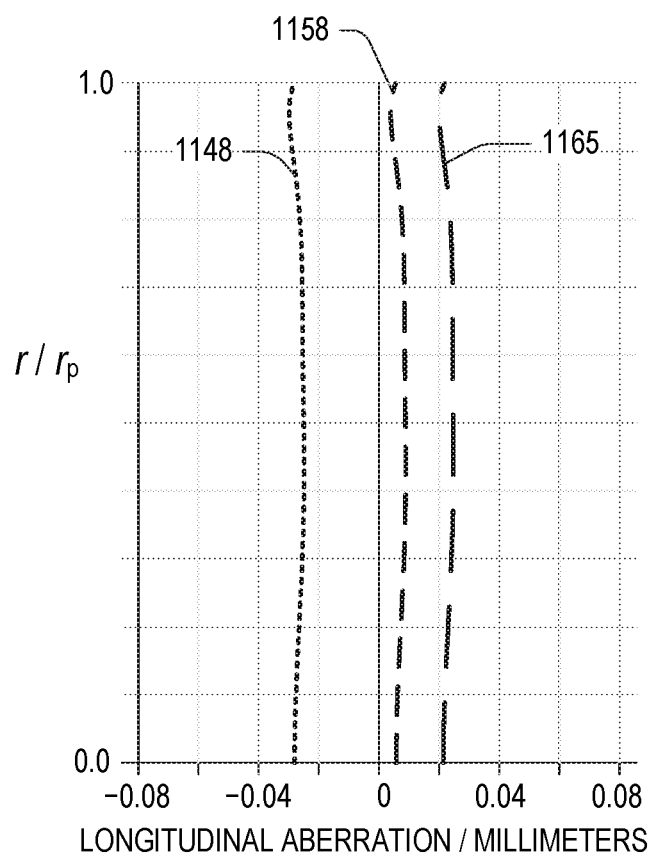
FIG. 11 is a plot of longitudinal aberration of the six-aspheric-surface lens within the imaging system of FIG. 9, according to the parameters of FIG. 10.

FIG. 11 is a plot of the longitudinal aberration of six-aspheric-surface lens 900. In FIG. 11, longitudinal aberration is plotted in units of millimeters as a function of normalized radial coordinate $r/r_p$, where $r_p$=0.8742 mm is the maximum entrance pupil radius. Longitudinal aberration curves 1148, 1158, and 1165 are computed at wavelengths $\lambda_F$, $\lambda_d$, and $\lambda_C$, respectively.

Figure 12:
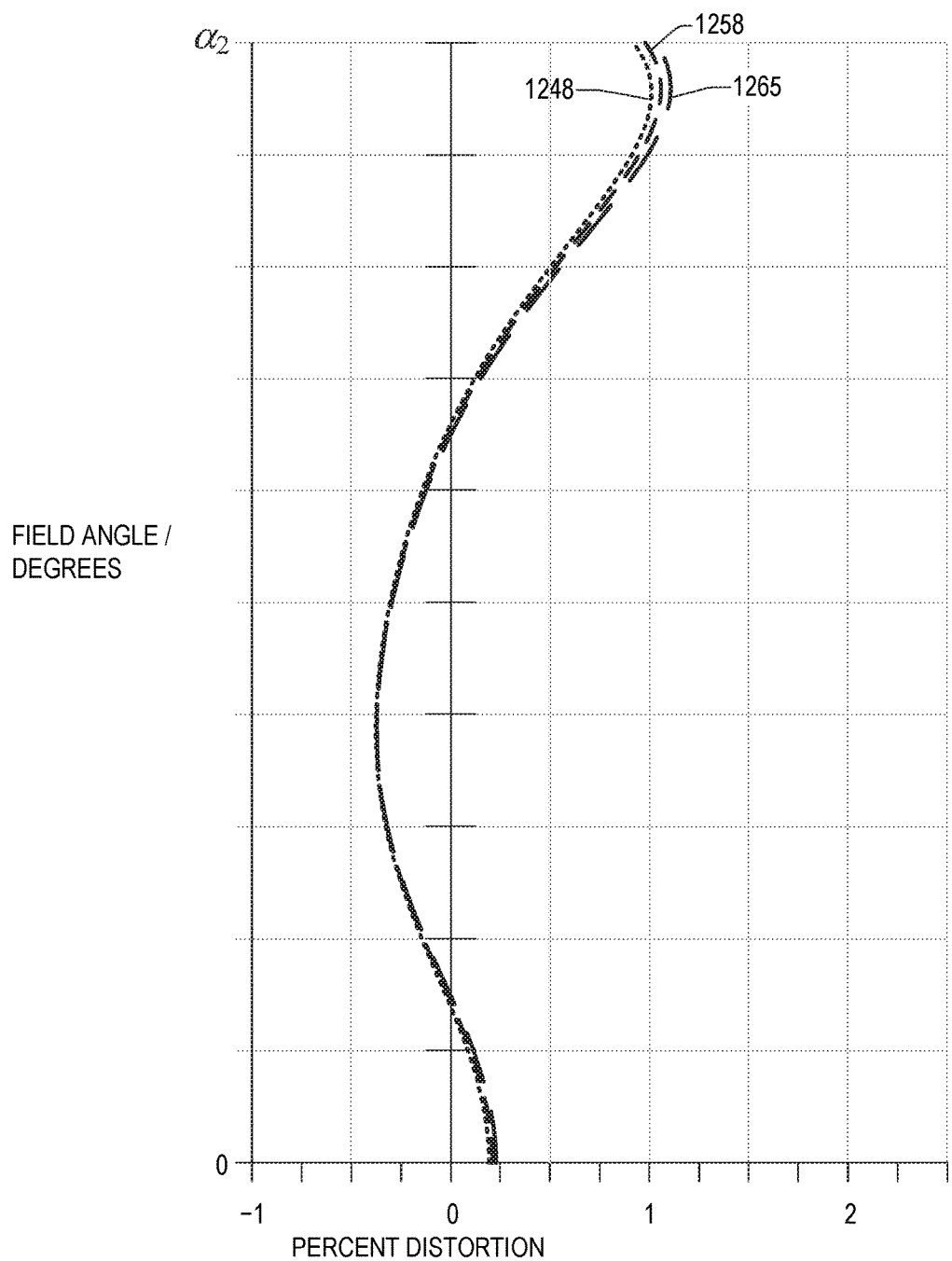
FIG. 12 is a plot of f-theta distortion of the six-aspheric-surface lens within the imaging system of FIG. 9, according to the parameters of FIG. 10.

FIG. 12 is a plot of the f-theta distortion, versus field angle, of six-aspheric-surface lens 900. The maximum field angle plotted in FIG. 12 is $\alpha_2$=17.506°, which is half of lens 900's field of view. Distortion curves 1248, 1258, and 1265 are computed at wavelengths $\lambda_F$, $\lambda_d$, and $\lambda_C$, respectively.

Figure 13:
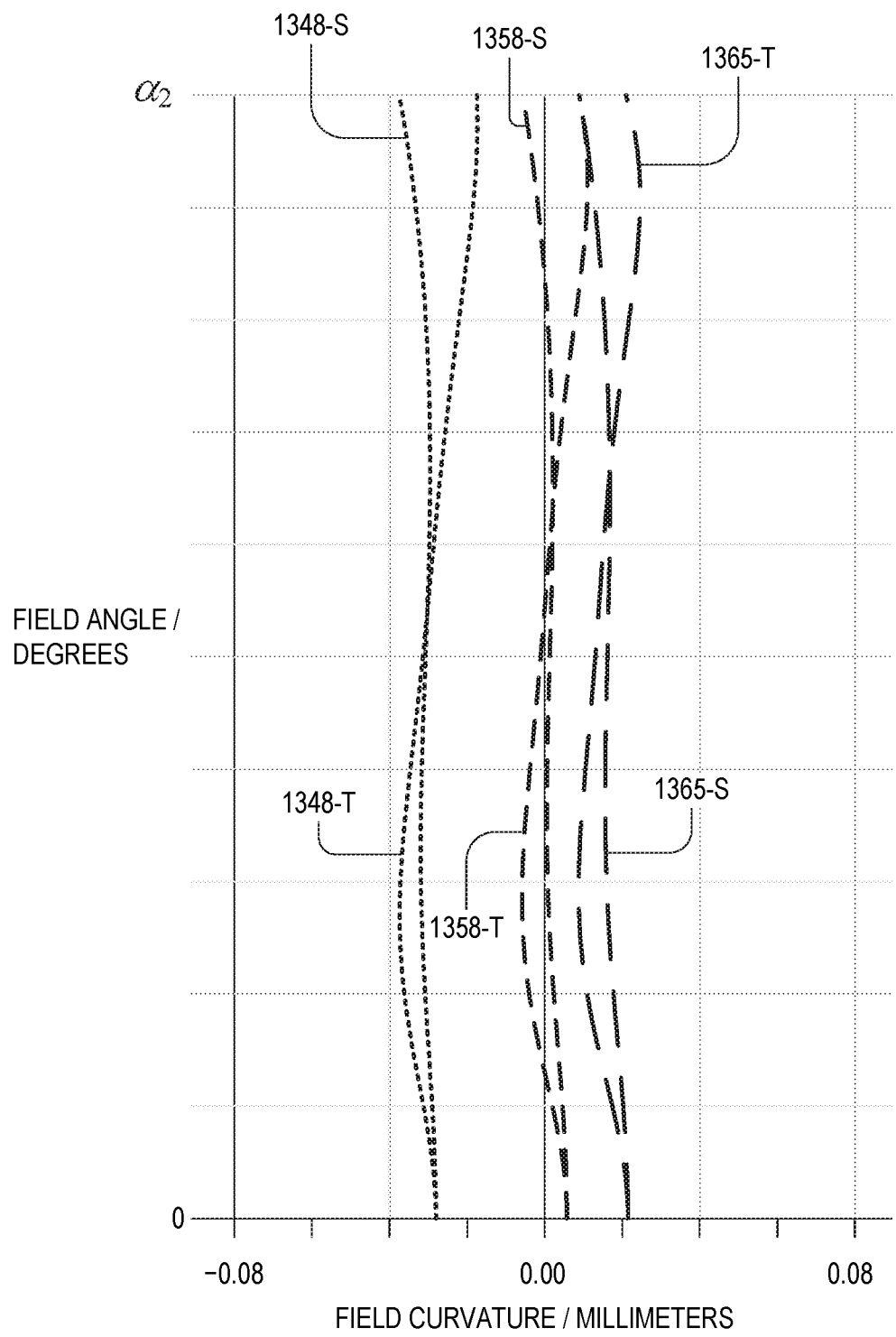
FIG. 13 is a plot of field curvature of the six-aspheric-surface lens within the imaging system of FIG. 9, according to the parameters of FIG. 10.

FIG. 13 is a plot of the Petzval field curvature, as a function of field angle, of six-aspheric-surface lens 900. The field curvature is plotted for field angles between zero and $\alpha_2$. Field curvature 1348-S and field curvature 1348-T (short-dashed lines) are computed at wavelength $\lambda_F$ in the sagittal and tangential planes, respectively. Field curvature 1358-S and field curvature 1358-T (medium-dashed lines) are computed at wavelength $\lambda_d$ in the sagittal and tangential planes, respectively. Field curvature 1365-S and field curvature 1365-T (long-dashed lines) correspond to field curvature at wavelength $\lambda_C$ in the sagittal and tangential planes, respectively.

Figure 14:
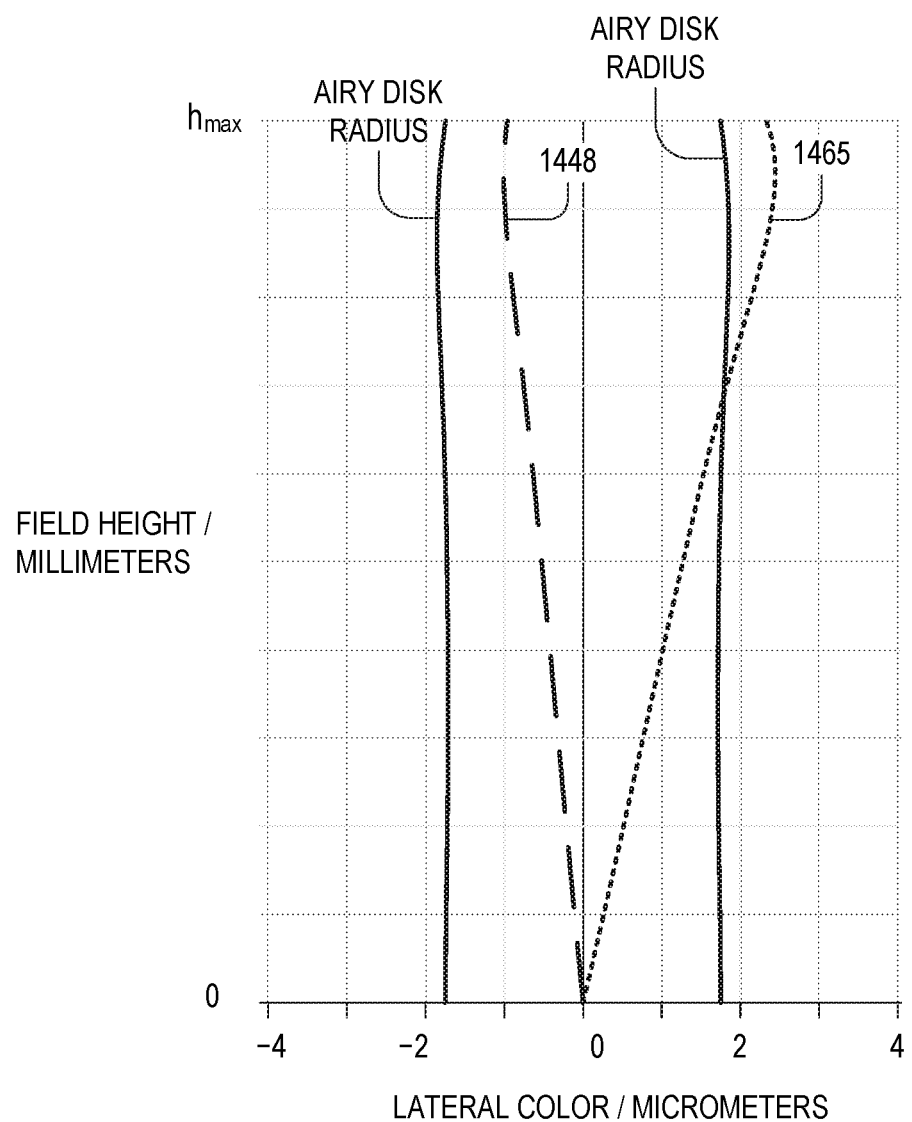
FIG. 14 is a plot of lateral color error of the six-aspheric-surface lens within the imaging system of FIG. 9, according to the parameters of FIG. 10.

FIG. 14 is a plot of the lateral color error, also known as transverse chromatic aberration, versus field height of six-aspheric-surface lens 900. Field height ranges from $h_{min}$=0 (on-axis) to $h_{max}$=1.234 mm in image plane 278(1). Lateral color is referenced to $\lambda_d$, and hence the lateral color for $\lambda_d$ is zero for all field heights. Lateral color 1448 is computed at wavelength $\lambda_F$. Lateral color 1465 is computed at wavelength $\lambda_C$.

Features described above as well as those claimed below may be combined in various ways without departing from the scope hereof. The following examples illustrate some possible, non-limiting combinations:

(A1) In an embodiment, a six-aspheric-surface lens has six coaxially aligned lenses. The six coaxially aligned lenses are, in order along the direction of light propagation, a positive first lens, a negative second lens, a negative third lens, a negative fourth lens, a negative fifth lens, and a plano-gull-wing sixth lens. The six-aspheric-surface lens also includes a first biplanar substrate between the first lens and the second lens, a second biplanar substrate between the third lens and the fourth lens, and a third biplanar substrate between the fifth lens and the sixth lens.

(A2) A six-aspheric-surface lens denoted by (A1) may have an effective focal length $f_{eff}$ such that (i) the six-aspheric-surface lens forms an image at an image plane located a distance T from a front surface of the first lens opposite the second lens, and (ii) $0.9 < T/f_{eff} < 1.1$.

(A3) In any six-aspheric-surface lens denoted by one of (A1) and (A2), the first lens may have a focal length $f_1$, and the second lens may have a focal length $f_2$ such that $-0.27 < f_1/f_2 < -0.17$.

(A4) In any six-aspheric-surface lens denoted by one of (A1) through (A3), the third lens may have a focal length $f_3$ and the fourth lens may have a focal length $f_4$ such that $-0.6 < f_{eff}(f_3+f_4)/(f_3 f_4) < -0.3$, wherein $f_{eff}$ is the effective focal length of the six-aspheric-surface lens.

(A5) In any six-aspheric-surface lens denoted by one of (A1) through (A4), the fifth lens may have a focal length $f_5$ and the sixth lens may have a focal length $f_6$ such that $1.1 < |f_{eff}(f_5+f_6)/(f_5 f_6)| < 1.25$, wherein $f_{eff}$ is the effective focal length of the six-aspheric-surface lens.

(A6) In any six-aspheric-surface lens denoted by one of (A1) through (A5) each of the six coaxially aligned lenses may be formed of a material having a melting point exceeding 250° C.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A six-aspheric-surface lens comprising:
   six coaxially aligned lenses including, in order along direction of light propagation, a positive first lens, a negative second lens, a negative third lens, a negative fourth lens, a negative fifth lens, and a plano-gull-wing sixth lens;
   a first biplanar substrate between the first lens and the second lens, the first lens including a rear surface proximate the first biplanar substrate and a front surface opposite the rear surface;
   a second biplanar substrate between the third lens and the fourth lens; and
   a third biplanar substrate between the fifth lens and the sixth lens,
   the six-aspheric-surface lens having an effective focal length $f_{eff}$ such that (i) the six-aspheric-surface lens forms an image at an image plane located at a distance T from the front surface of the first lens, and (ii) $0.9 < T/f_{eff} < 1.02$.

2. The six-aspheric-surface lens of claim 1, the first lens having a focal length the second lens having a focal length $f_2$ such that $0.27 < f_1/f_2 < 0.17$.

3. The six-aspheric-surface lens of claim 1, the first lens having an Abbe number exceeding 48, the second lens and the third lens each having an Abbe number less than 35.

4. The six-aspheric-surface lens of claim 1, having an effective focal length $f_{eff}$, the third lens having a focal length $f_3$, the fourth lens having a focal length $f_4$ such that $-0.6 < f_{eff}(f_3+f_4)/(f_3 f_4) < -0.3$.

5. The six-aspheric-surface lens of claim 1, having an effective focal length $f_{eff}$, the fifth lens having a focal length $f_5$, the sixth lens having a focal length $f_6$ such that $1.1 < |f_{eff}(f_5+f_6)/(f_5 f_6)| < 1.25$.

6. The six-aspheric-surface lens of claim 1, each of the six coaxially aligned lenses being formed of a material having a melting point exceeding 250° C.

* * * * *